United States Patent
Lai et al.

(10) Patent No.: US 6,814,468 B2
(45) Date of Patent: Nov. 9, 2004

(54) STRUCTURE OF LIGHT BOX ASSEMBLY

(75) Inventors: Peng-Cheng Lai, Banchiao (TW);
Yu-Chang Chang, Hsinchu (TW);
Kun-Yan Wu, Fengyuan (TW);
Yao-Lung Tsai, Heping Township, Taichung County (TW)

(73) Assignee: Waytech Development, Inc., Hsinchu (TW)

( * ) Notice: Subject to any disclaimer, the term of this patent is extended or adjusted under 35 U.S.C. 154(b) by 0 days.

(21) Appl. No.: 10/603,602

(22) Filed: Jun. 26, 2003

(65) Prior Publication Data

US 2004/0042231 A1 Mar. 4, 2004

(30) Foreign Application Priority Data

Aug. 30, 2002 (TW) ........................................ 91213631 U

(51) Int. Cl.⁷ .................................................. F21V 1/00
(52) U.S. Cl. ........................... 362/240; 362/11; 362/16; 362/225; 362/311
(58) Field of Search .................................. 362/3, 11, 16, 362/227, 240, 245–246, 355, 225

(56) References Cited

U.S. PATENT DOCUMENTS

| | | | | |
|---|---|---|---|---|
| 4,404,619 A | * | 9/1983 | Ferguson | .................... 362/222 |
| 4,418,378 A | * | 11/1983 | Johnson | ........................ 362/97 |
| 4,691,267 A | * | 9/1987 | Giesberg | ..................... 362/218 |
| 6,672,737 B2 | * | 1/2004 | Lai et al. | ..................... 362/240 |

* cited by examiner

Primary Examiner—Alan Cariaso
Assistant Examiner—Ali Alavi
(74) Attorney, Agent, or Firm—Rosenberg, Klein & Lee

(57) ABSTRACT

A structure of light box assembly is disclosed in the invention, which includes an upper plastic frame and a lower plastic frame, and each of them can be formed by a plastic sheet or two same plastic sheets. Besides, at least four supporting columns are used to connect and support the two plastic frames. In addition, a plurality of side plate, an upper cover plate, and a lower cover plates are separately installed according to different planes formed by each of the plastic frames and each of the supporting columns so as to construct a box body. Also, an erect diffusion plate is provided at each corner of the box body corresponding to the position of its relative supporting column so that each of the four diffusion plates is to cover the outer field of each of the vertical light tubes. Thus, uniformly distributed light can be provided, and a solid and uniform light source can be provided as well. Moreover, the invention provides a structure of box body by using same plastic members in accordance with their supporting columns and side plates as well as employing a sliding-in method for assembling each component so that fast assembly as well as easy assembly and disassembly can be achieved.

11 Claims, 8 Drawing Sheets

STRUCTURE OF LIGHT BOX ASSEMBLY

BACKGROUND OF THE INVENTION

1. Field of the Invention

The invention relates to a photographic light source supplying device that is applied in a photographic studio or a light box for color matching and, more particularly, to a structure of light box assembly that its light source is uniformly distributed.

2. Description of the Related Art

Commercial photographs must be taken with best effect in clearness and color, and thus all kinds of merchandise and product can be presented to consumers with authenticity and perfection. Therefore, when a digital camera or common camera is used for photographing, the light source must be provided uniformly and sufficiently so that a clear, colorful image can be taken. When photographing, a copy stand for simple photographic studio or a light box for color matching will be used to provide necessary light source for photographing.

As shown in FIG. 1, a conventional light box for color matching 10 (or a conventional simple photographic studio) is to provide an opening 14 at one side of a box body 12 so that an object to be photographed can be placed inside the box body 12 through the opening 14. Besides, a plurality of light tube 16 is separately provided in parallel on top face of the box body 12, and a curtain 18 is provided at the opening 14 to block external light source. However, regarding to such light box for color matching 10, since the light tubes 16 can only be provided on top face of the box body 12, the light source generated by the light tubes 16 can be converged within a specific range only, or the light source can only be evenly generated on a single plane. In other words, the light source cannot be solid and uniform, and it can only be uniformly distributed when a planar object is photographed. In addition, the light box for color matching 10 is making the brightness of light located at the central area right below the light tubes 16 brighter than that of located at the other areas, which means the light source is unable to provide even light to all directions. Consequently, photographic drawbacks such as color distortion or color-matching distortion might be easy to happen.

The light source of a conventional simple photographic studio or a light box for color matching is provided on the upper side of the box body, and the light can only be converged on the object being photographed, which means the brightness and uniformity of light inside the box body cannot be increased. Moreover, the method for assembling the aforementioned box body is to screw a plurality of iron sheet or wood chip together without being accompanied by any plastic members. Therefore, the box body can be pretty heavy and not easy to be disassembled, assembled, or moved; in other words, it is not handy for using.

Therefore, focusing on the foregoing drawbacks, the invention provides a structure of light box assembly, which can provide an uniformly distributed light source and has the advantage of easy and fast assembly, to solve the conventional drawbacks.

SUMMARY OF THE INVENTION

The primary and first object of the invention is to provide a structure of light box assembly, which is to join a plurality of same plastic member together to form a larger plastic frame so that the size of the plastic injection molder and the quantity of the molder can be reduced, and the injection can be completed without applying large plastic injection molding machine.

The second object of the invention is to provide a structure of light box assembly, wherein the light provided from an erect light source can be more uniformly distributed because a plurality of vertical light tube inside the light box is designed to be matched with its corresponding erect diffusion plate; therefore, a light source capable of supplying solid and uniform light can be provided so that the color and size of the object inside the light box will not be distorted due to difference in light intensity.

The third object of the invention is to provide a structure of light box assembly, which utilizes a method of sliding-in to easily assemble every component so that a fast assembly can be achieved.

The fourth object of the invention is to provide a structure of light box assembly that is easy to be assembled and disassembled so that the light box will not be bulky when transportation is involved.

The fifth object of the invention is to provide a structure of light box assembly, which can increase brightness of the light box as well as increase definition of the image.

To achieve the aforementioned objectives, the structure of light box assembly includes an upper plastic frame and a lower plastic frame, and each of them can be formed by a plastic sheet or two same plastic sheets. Besides, at least four supporting columns are used to connect and support the two plastic frames. In addition, a plurality of side plate, an upper cover plate, and a lower cover plates are separately installed according to different planes formed by each of the plastic frames and each of the supporting columns so as to construct a box body. Also, an erect diffusion plate is provided at each corner of the box body corresponding to the position of its relative supporting column, and an erect light tube is provided between each supporting column and its relative diffusion plate to provide uniformly distributed light.

The objects and technical contents of the invention will be better understood through the description of the following embodiments with reference to the drawings.

DETAILED DESCRIPTION OF THE PREFERRED EMBODIMENTS

The invention employs same plastic members to form an upper plastic frame and a lower plastic frame, and the two frames and their supporting columns construct a structure of simple box body. Also, erect diffusion plates at the corner of the box body are designed to uniformly distribute light coming from the erect light source. In addition, because each plastic frame can be an integrally formed plastic sheet or can be formed by joining at least two same plastic sheets together, the plastic frame can be designed according to different requirements. Herein, the following contents are using a plastic frame formed by four pieces of L-shaped plastic members that are exactly the same and can be interchangeably used to illustrate the embodiments of the invention.

Figure 1:
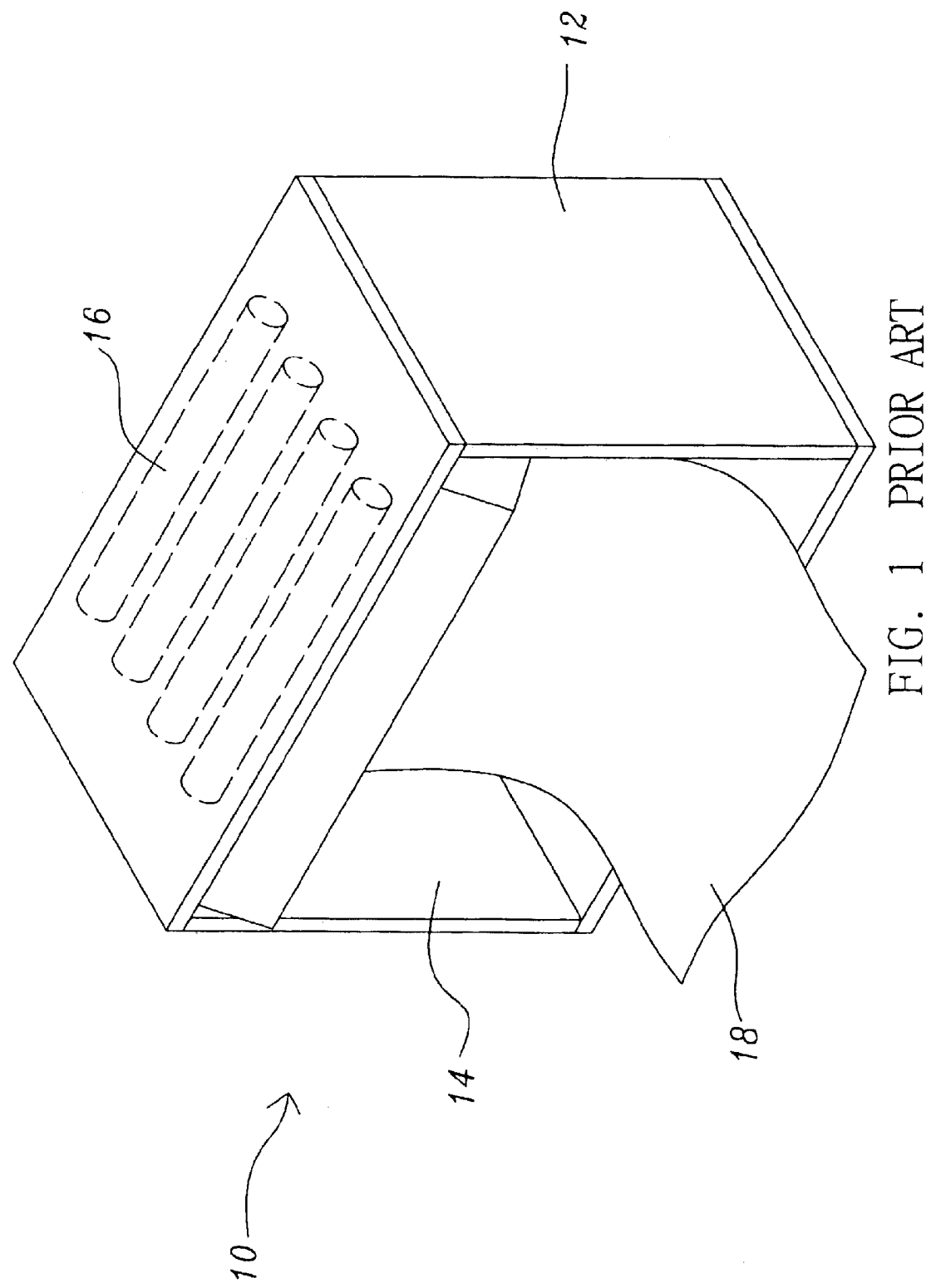
FIG. 1 is a schematic diagram showing the external view of a conventional simple photographic studio.
Figure 2:
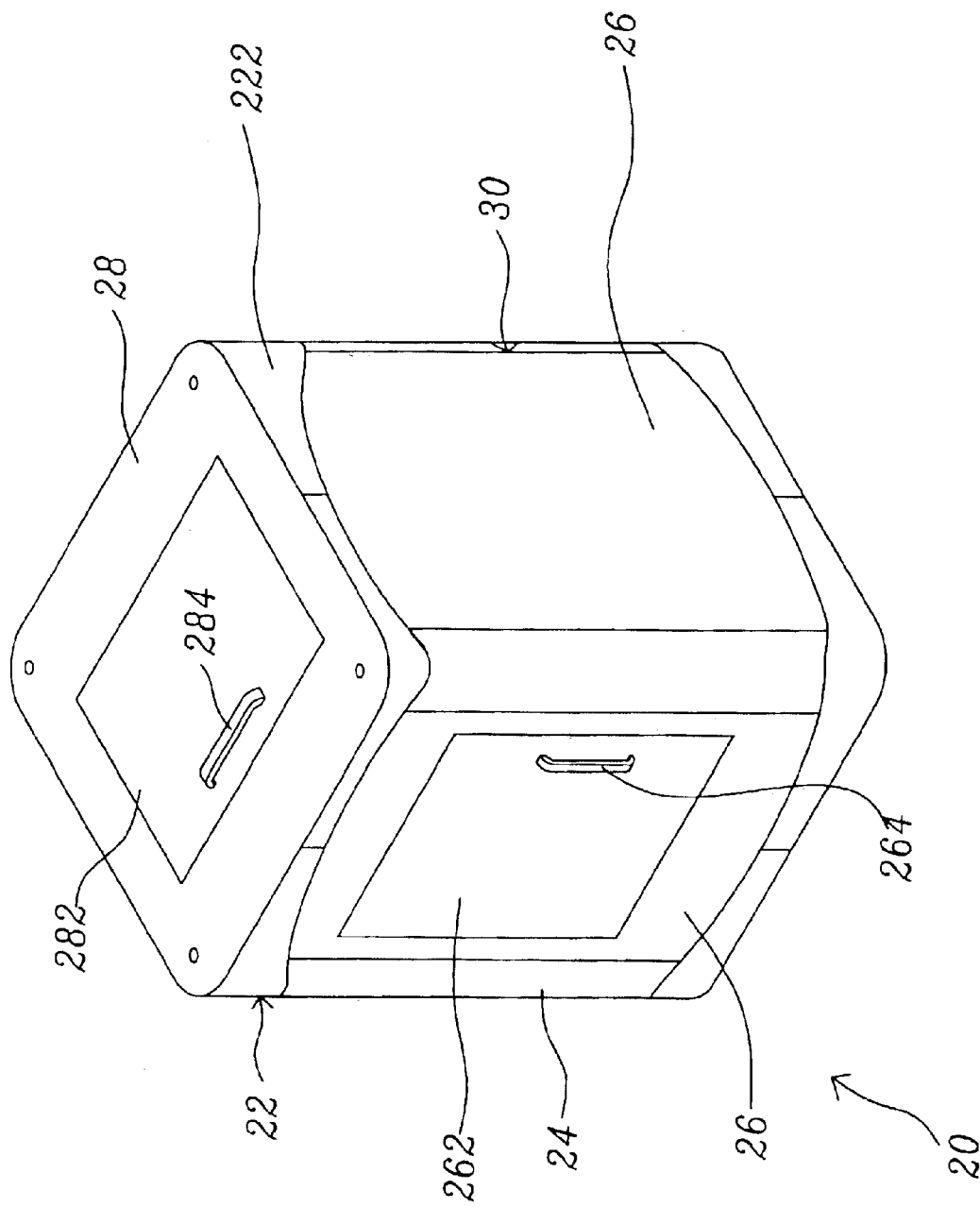
FIG. 2 is a schematic diagram showing the external perspective view of the invention.
Figure 3:
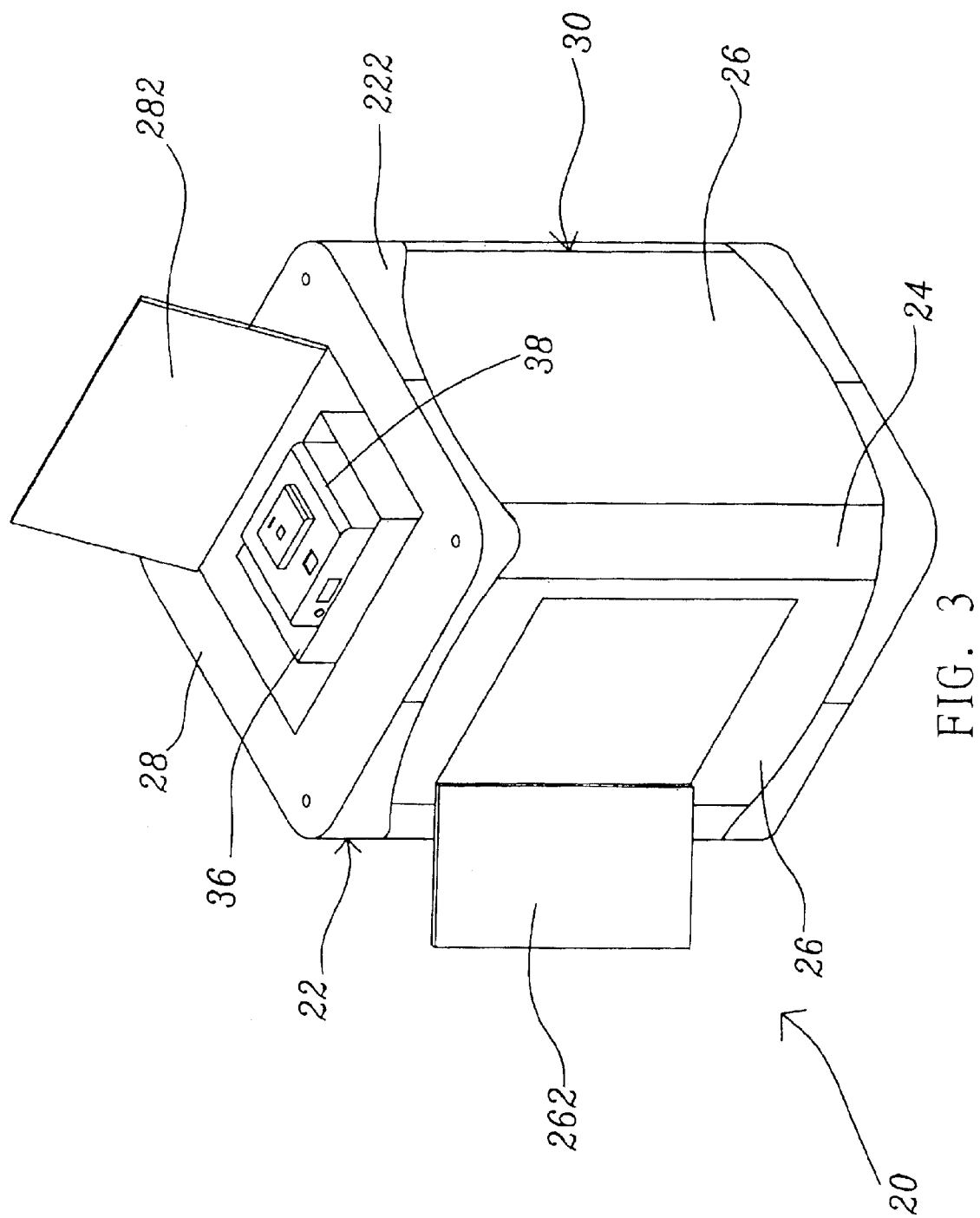
FIG. 3 is a schematic diagram showing that a pull-open lid and a pull-open door of the invention are open.
Figure 4:
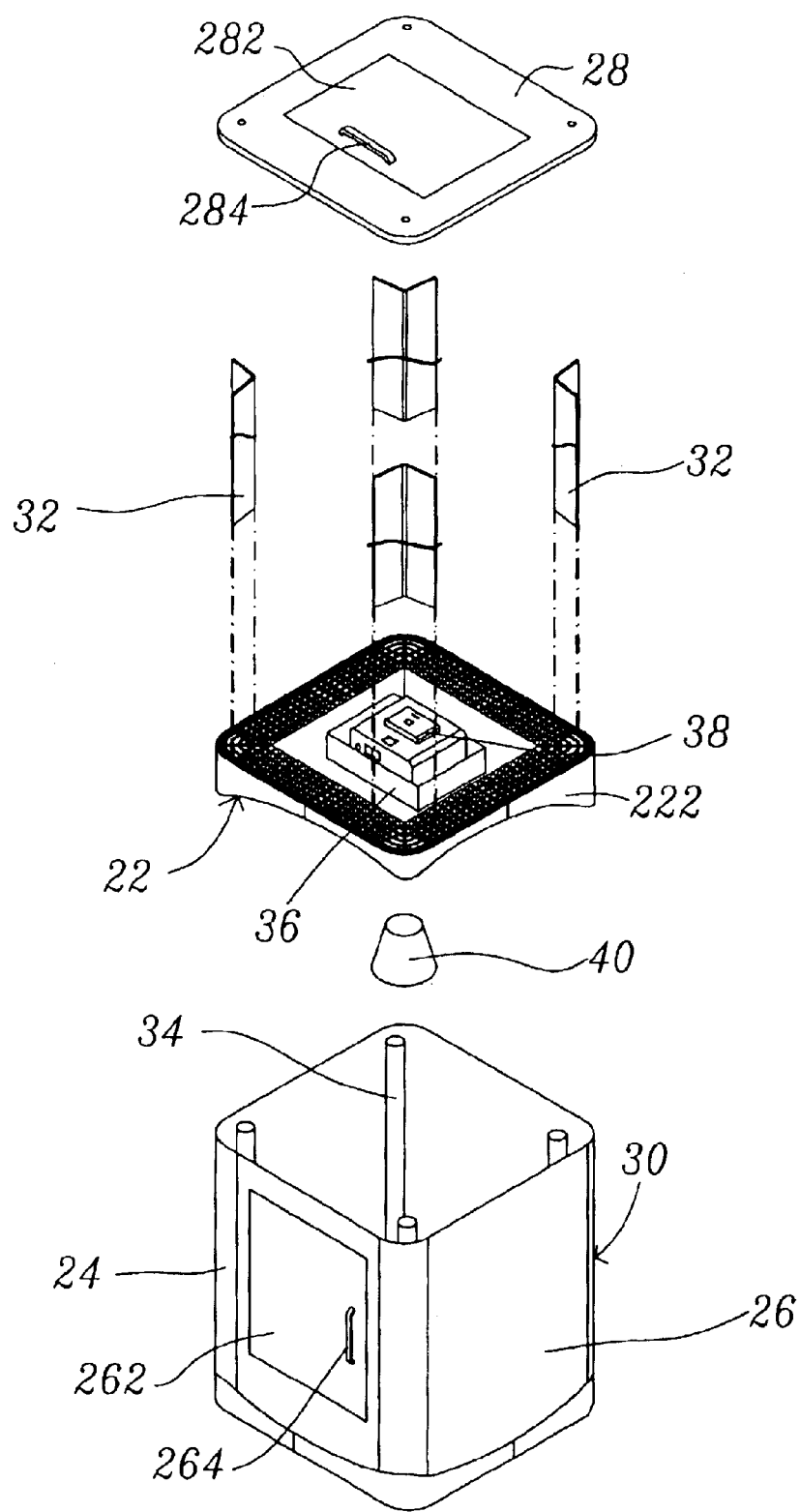
FIG. 4 is a perspective exploded view showing the structure of the invention.
Figure 5:
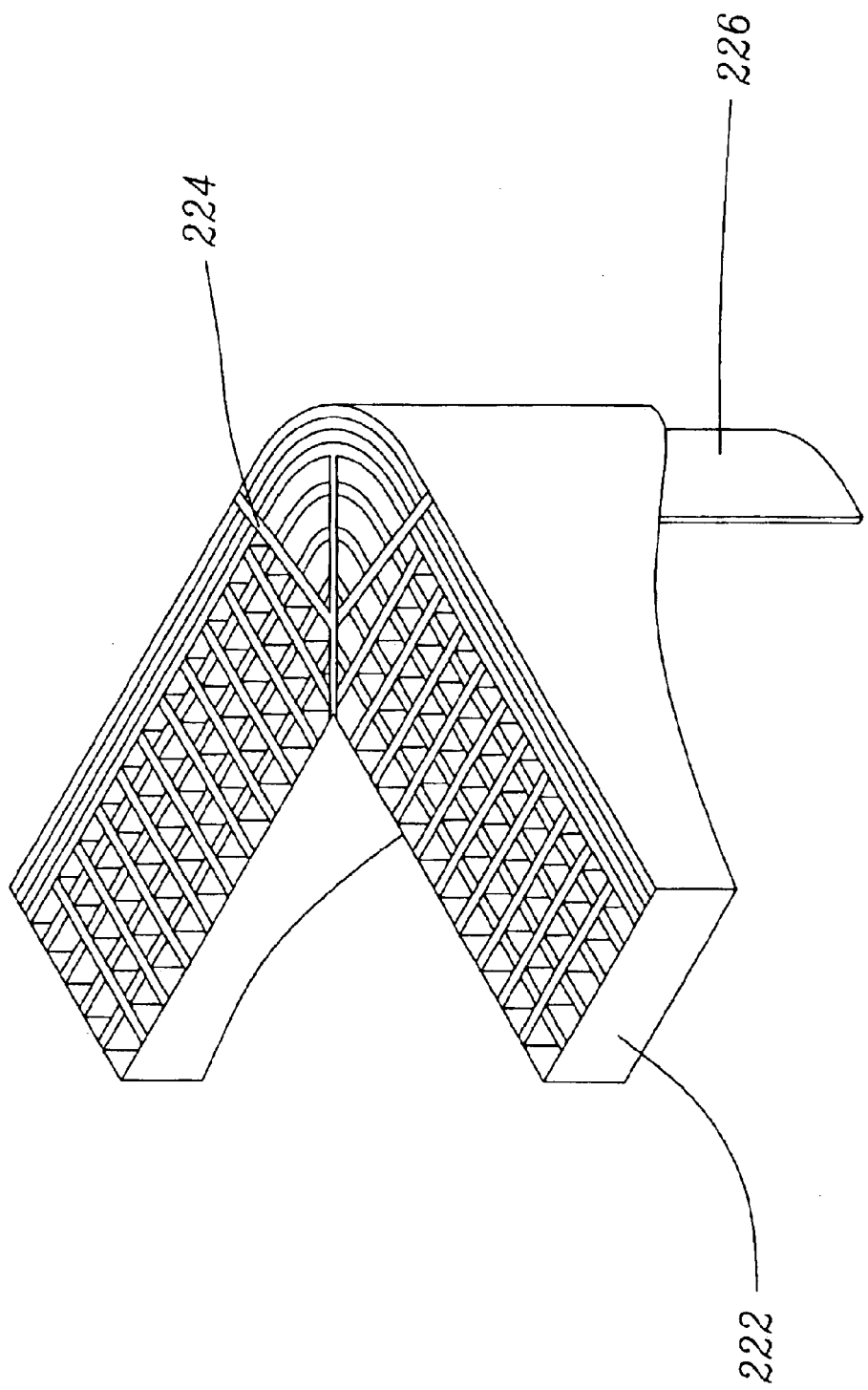
FIG. 5 is a schematic diagram showing the structure of a single plastic member used by the invention.
Figure 6:
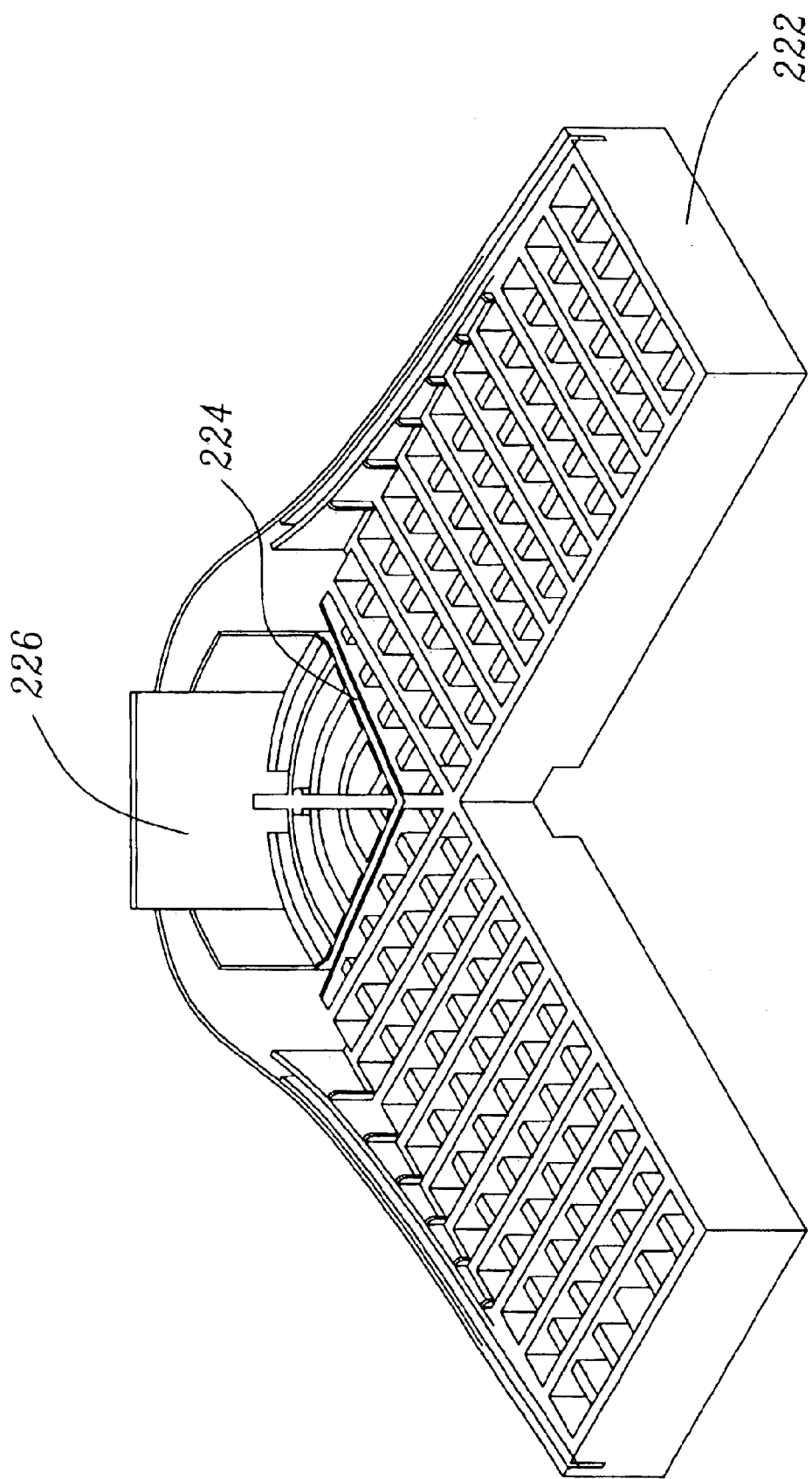
FIG. 6 is a schematic diagram showing the single plastic member shown in FIG. 5 being viewed from another direction.

As shown in FIGS. 2, 3 & 4, a structure of light box assembly 20 includes two plastic frames 22 placed in parallel with one on the upper side and the other on the lower side, and each plastic frame is formed by four pieces of L-shaped plastic members 222 that are exactly the same and can be interchangeably used. FIG. 5 & FIG. 6 show the detailed structure of the L-shaped plastic members 222. As shown in the FIGS., a L-shaped slot 224 is provided at each of the four corners formed by L-shaped plastic members 222. Besides, a sliding-in portion 226 is provided at the edge of each corner of the L-shaped plastic members 222, ready to be embedded in by the supporting columns, while the perimeter of each plastic member 222 is to be connected to side plates. In addition, four pieces of supporting columns 24 are used to connect and support the upper and lower plastic frames 22 in a way that each supporting column 24 can be embedded into one of the sliding-in portions 226 corresponding to the L-shaped plastic member 222 of the plastic frame 22. Then, a side plate 26 is embedded in at each of the four planes formed by the two plastic frames 22 and the four supporting columns 24 so that the four side plates 26 can be separately installed among the four adjacent supporting columns 24 within the upper and lower plastic frames 22. Also, a pull-open door 262 is provided on one of the side plates 26 and can be opened and shut, and a door handle 264 is provided on the pull-open door 262 to facilitate opening and shutting activity. Moreover, an upper cover plate 28 and a lower cover plate 30 are provided on each of the outer surface of the upper and lower plastic frames 22 respectively. Also, a pull-open lid 282 is provided on the upper cover plate 28, and a lid handle 284 is also provided on the pull-open lid 282. Thus, by assembling the aforementioned components, the structure of a box body 30 is completed.

Figure 7:
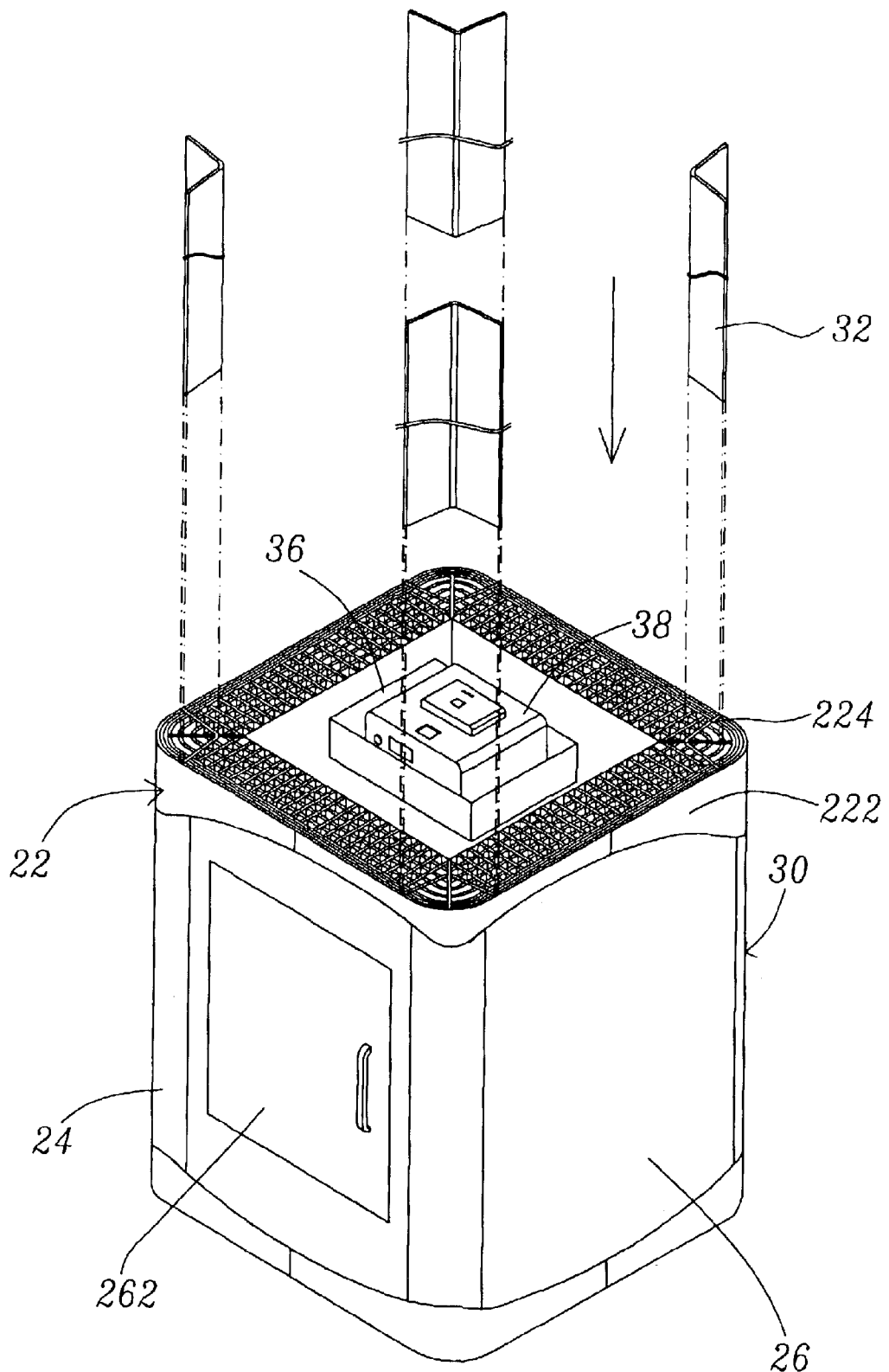
FIG. 7 is a schematic diagram showing installation of a diffusion plate of the invention.

Also, referring to FIG. 7, a diffusion plate 32 is vertically installed into each of the L-shaped slots 224 at four corners of the plastic frames 22. Then, after the diffusion plates 32 have been installed into the L-shaped slots 224 of the plastic frames 22, the diffusion plates 32 will be located at the four corners of the box body 30 corresponding to the four supporting columns 24 respectively. Also, each of the four light tubes 34 is vertically installed between each supporting column 24 and diffusion plate 32 respectively so that each of the four diffusion plates 32 is to cover the outer field of each of the vertical light tubes 34. The material of the diffusion plates 32 can be transparent plastic or glass, and a grain-like structure is provided distributing uniformly on the surface of the diffusion plates 32. Additionally, the shape of the diffusion plates 32 is also designed in L shape matching with the L-shaped slot 224. However, the diffusion plates 32 should not be limited to the L shape only; instead, the slot can be designed as a plane or an arc in accordance with its corresponding diffusion plate 32.

Figure 8:
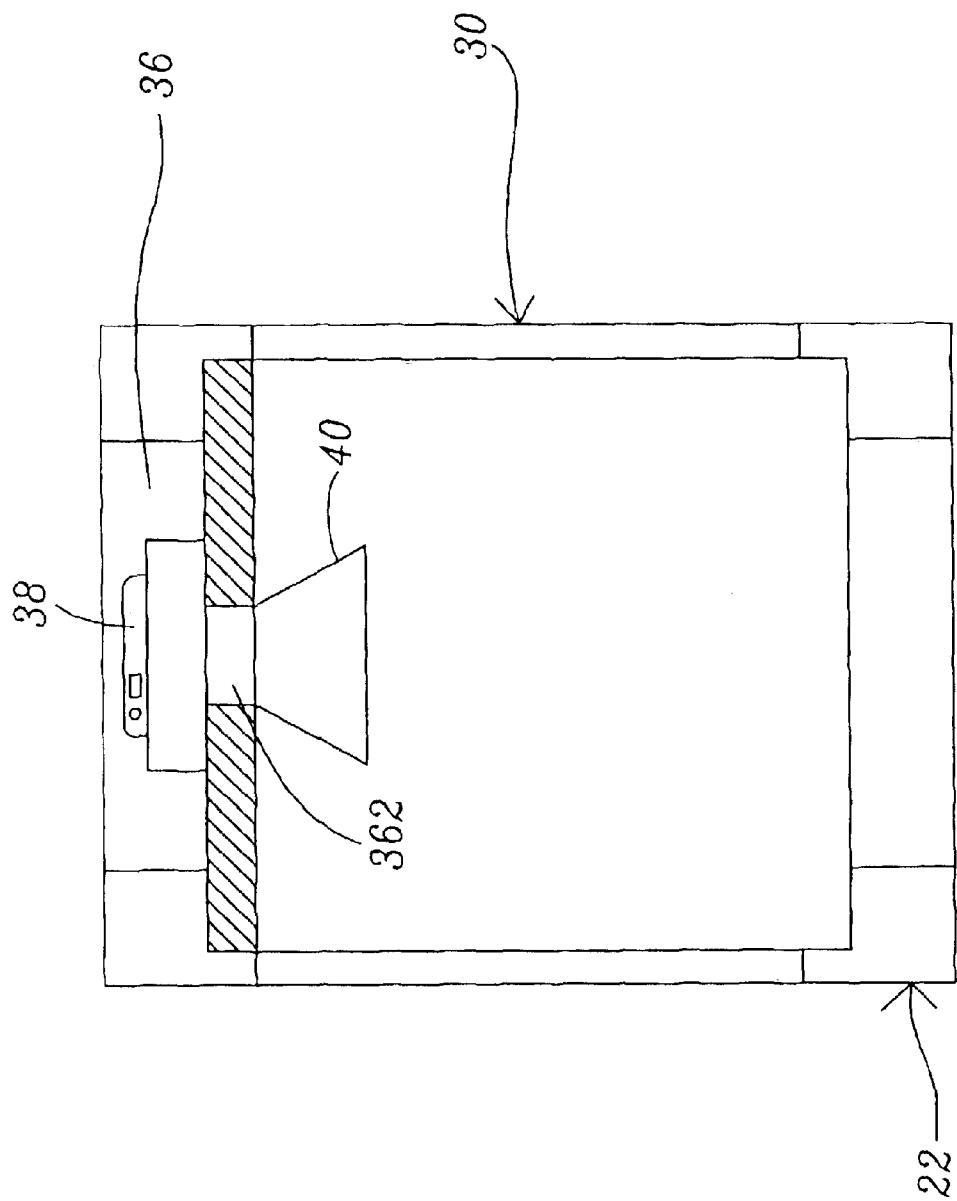
FIG. 8 is a sectional view of the structure of the invention.

Moreover, a camera room 36 that can accommodate a camera 38 is further provided beneath the upper cover plate 28 and at the top inner side of the box body 30, and the position of the camera room 36 is corresponding to that of the pull-open lid 282 so that the camera 38 can be placed in and taken out from the camera room 36 conveniently for photographing. Besides, referring to FIG. 8, an opening 362 is formed at the bottom of the camera room 36, allowing the lens of the camera 38 to stick out from the camera room 36 so that the object inside the box body 30 can be photographed. Also, a light-blocking lens hood 40 is provided along the periphery of the opening 362 at the bottom of the camera room 36 so that there is no other light-blocking lens hood to be required when the camera 38 placed above the lens hood inside the camera room 36 is used for photographing, and thus the influence on the lens of the camera 38 made by the light source can be reduced.

Furthermore, because the aforementioned supporting columns 24 are embedded into the plastic frames 22 by sliding in, there is no need to use any fastening member to assemble the box body 30, or a few of fastening members such as a screw may be needed to finish assembling the box body 30 rapidly and also provide consolidation to it. On the other hand, the four side plates 26 located at the four sides of the box body 30 also employ the sliding-in method to be embedded in among the supporting columns 24 and within the upper and lower plastic frames 22 without any help of any fastening member.

The invention is to join a plurality of same plastic member together to form a larger plastic frame so that the size of the plastic injection molder and the quantity of the molder can be reduced, and the injection can be completed without applying large plastic injection molding machine. Besides, the light coming from an erect light source can be more uniformly distributed because a plurality of vertical light tube inside the light box is designed to match with its corresponding erect diffusion plate. Therefore, a light source capable of supplying solid and uniform light can be provided so that the color and size of the object inside the light box will not be distorted due to difference in light intensity. Meanwhile, the brightness inside the light box can be increased so that the definition of the image can be enhanced as well. In addition, the invention is to slide the diffusion plates into the L-shaped slots of the L-shaped plastic members without applying any screw for fastening the diffusion plates, which in turn can facilitate the replacement of light tubes inside the diffusion plates to be easier. Moreover, the sliding-in method is applied to assemble every component of the light box so that a fast assembly can be achieved. Finally, since the structure of light box assembly has an advantage of easy assembly and disassembly, it will not become bulky when transportation is involved.

The embodiments above are only intended to illustrate the technical contents of the invention; they do not, however, to limit the invention to the specific embodiments. Accordingly, various modifications and changes may be made without departing from the spirit and scope of the invention as described in the appended claims.

What is claimed is:

1. A structure of light box assembly, including:
  two plastic frames, provided in parallel with one on the upper side and the other on the lower side;
  at least four supporting columns, for connecting and supporting the two plastic frames;
  a plurality of side plate, an upper cover plate, and a lower cover plate, which are separately installed according to different planes formed by each of the plastic frames and each of the supporting columns so as to construct a box body;

four diffusion plates, wherein each diffusion plate is vertically provided in each corner of the box body corresponding to the position of its relative supporting column; and four light tubes, wherein each light tube is vertically provided between its corresponding supporting column and diffusion plate.

2. The structure of light box assembly as claimed in claim 1, wherein each of the two plastic frames is constructed by joining at least two same plastic members together.

3. The structure of light box assembly as claimed in claim 1, wherein the supporting columns are installed within the upper and lower plastic frames through sliding in.

4. The structure of light box assembly as claimed in claim 1, wherein each of the side plates is installed between two adjacent supporting columns as well as within the upper and lower plastic frames through sliding in.

5. The structure of light box assembly as claimed in claim 1, wherein a slot is provided at each of the four corners of the upper and lower plastic frames corresponding to one another so that the diffusion plates can be embedded into the slots of the upper and lower plastic frames.

6. The structure of light box assembly as claimed in claim 1, wherein the shape of the diffusion plates provided at the corners can be designed as an L shape or a plane or an arc.

7. The structure of light box assembly as claimed in claim 1, wherein the material of the diffusion plates provided at the corners is made of transparent plastic or glass, and a grain-like structure is provided distributing uniformly on the surface of the diffusion plates.

8. The structure of light box assembly as claimed in claim 1, wherein a pull-open lid that can be opened and shut is provided on the upper cover plate.

9. The structure of light box assembly as claimed in claim 1, wherein a pull-open door that can be opened and shut is provided on one of the side plates.

10. The structure of light box assembly as claimed in claim 1 or claim 8, wherein a camera room is further provided beneath the upper cover plate and at the top inner side of the box body; besides, an opening is formed at the bottom of the camera room allowing the lens of a camera to stick out from the camera room.

11. The structure of light box assembly as claimed in claim 10, wherein a light-blocking lens hood is provided along the periphery of the opening at the bottom of the camera room.

* * * * *